US012129395B2

(12) United States Patent
Igami

(10) Patent No.: US 12,129,395 B2
(45) Date of Patent: Oct. 29, 2024

(54) COMPOSITION FOR FORMING HARD COAT LAYER, AND EYEGLASS LENS

(71) Applicant: NIKON-ESSILOR CO., LTD., Tokyo (JP)

(72) Inventor: Yuka Igami, Tokyo (JP)

(73) Assignee: NIKON-ESSILOR CO., LTD., Tokyo (JP)

( * ) Notice: Subject to any disclaimer, the term of this patent is extended or adjusted under 35 U.S.C. 154(b) by 707 days.

(21) Appl. No.: 17/358,338

(22) Filed: Jun. 25, 2021

(65) Prior Publication Data

US 2021/0317336 A1 Oct. 14, 2021

Related U.S. Application Data

(63) Continuation of application No. PCT/JP2019/048730, filed on Dec. 12, 2019.

(30) Foreign Application Priority Data

Dec. 28, 2018 (JP) ................. 2018-247236

(51) Int. Cl.
*C09D 183/08* (2006.01)
*B29D 11/00* (2006.01)
(Continued)

(52) U.S. Cl.
CPC ...... *C09D 183/08* (2013.01); *B29D 11/00884* (2013.01); *C09D 7/61* (2018.01);
(Continued)

(58) Field of Classification Search
CPC .......... C09D 183/08; C09D 7/61; C09D 7/63; C09D 4/00; C09D 5/00; C09D 143/02;
(Continued)

(56) References Cited

U.S. PATENT DOCUMENTS

2018/0094161 A1 4/2018 Lee et al.
2019/0293840 A1 9/2019 Takeshita

FOREIGN PATENT DOCUMENTS

CN 107880612 4/2018
JP 2001-226634 8/2001
(Continued)

OTHER PUBLICATIONS

"Coating Process—vol. 9", coating technology training class of former Ministry of Fuel and Chemical Industries, p. 173, Chemical Industry Press, Apr. 30, 1983 (Common Knowledge Evidence 1).
(Continued)

*Primary Examiner* — James C. Jones

(57) ABSTRACT

The present invention provides a composition for forming a hard coat layer, which is capable of forming a hard coat layer that exhibits excellent adhesion to an adjacent layer, while having excellent hardness. A composition for forming a hard coat layer according to the present invention contains: a (meth)acrylate which has at least one group that is selected from the group consisting of a phosphoric acid group and a sulfonic acid group; a silsequioxane which has a radically polymerizable group; and metal oxide particles.

10 Claims, 1 Drawing Sheet

(51) Int. Cl.
*C09D 7/61* (2018.01)
*C09D 7/63* (2018.01)
*G02C 7/02* (2006.01)

(52) U.S. Cl.
CPC .............. *C09D 7/63* (2018.01); *G02C 7/022* (2013.01); *G02C 2202/16* (2013.01)

(58) Field of Classification Search
CPC ................ C09D 143/04; C09D 183/04; B29D 11/00884; B29D 11/00009; B29D 11/00865; G02C 7/022; G02C 2202/16; G02C 7/02; C08F 230/08; C08F 2/44; C08F 2/48; C08G 77/20; C08K 3/22; G02B 1/14
See application file for complete search history.

(56) References Cited

FOREIGN PATENT DOCUMENTS

| | | | | |
|---|---|---|---|---|
| JP | 2007-9079 | | 1/2007 | |
| JP | 2007009079 | * | 1/2007 | ............... C09D 1/00 |
| JP | 2012-209232 | | 10/2012 | |
| JP | 2015-224294 | | 12/2015 | |
| JP | 2017-101100 | | 6/2017 | |

OTHER PUBLICATIONS

"Automobile Coating Technology", Lin Mingyu, pp. 65-66, Beijing Institute of Technology Press, Sep. 30, 1998 (Common Knowledge Evidence 2).
English Translation of Bibliographic Information and Cited part of Common Knowledge Evidence 1&2 (1 pg.).
Office Action, dated Mar. 16, 2022, in corresponding Chinese Patent Application No. 201980086501.7 (11 pp.).
Korean Office Action dated Mar. 24, 2023 in corresponding Korean Application No. 10-2021-7019231.
International Search Report, dated Feb. 10, 2020, in corresponding International Application No. PCT/JP2019/048730 (6 pp.).
Office Action, dated Oct. 27, 2022, in corresponding Canadian Patent Application No. 3,125,081 (3 pp.).
Canadian Office Action dated Jun. 2, 2023 for corresponding Canadian Application No. 3,125,081.
Office Action, dated Oct. 27, 2021, in corresponding Chinese Patent Application No. 201980086501.7 (24 pp.).
Extended European Search Report, dated Sep. 7, 2022, in corresponding European Patent Application No. 19905132.719901532.7 (7 pp.).
Office Action, dated Aug. 12, 2022, in corresponding Chinese Patent Application No. 201980086501.7 (21 pp.).
Extended European Search Report, dated Sep. 7, 2022, in corresponding European Patent Application No. 19901532.7 (7 pp.).

* cited by examiner

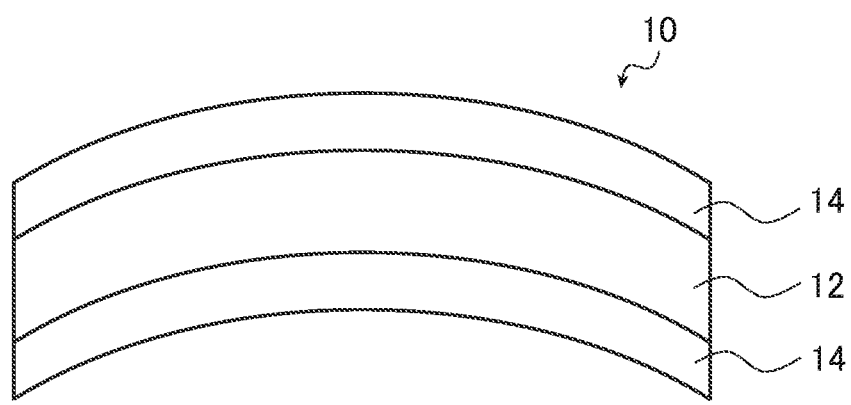

COMPOSITION FOR FORMING HARD COAT LAYER, AND EYEGLASS LENS

CROSS-REFERENCE TO RELATED APPLICATIONS

This application is a Continuation of PCT International Application No. PCT/JP2019/048730 filed on Dec. 12, 2019, which claims priority under 35 U.S.C. § 119(a) to Japanese Patent Application No. 2018-247236 filed on Dec. 28, 2018. The above application is hereby expressly incorporated by reference, in its entirety, into the present application.

TECHNICAL FIELD

The present invention relates to a hard coat layer-forming composition and a spectacle lens.

BACKGROUND ART

A curable resin composition containing a silsesquioxane compound having a radical polymerizable group is useful as a hard coat agent (for example, JP 2015-224294 A).

SUMMARY OF INVENTION

The disclosure relates to a hard coat layer-forming composition comprising: a (meth)acrylate having at least one group selected from the group consisting of a phosphate group and a sulfonate group; a silsesquioxane having a radical polymerizable group; and metal oxide particles.

BRIEF DESCRIPTION OF DRAWINGS

FIG. 1 is a cross-sectional view of a spectacle lens of one embodiment.

DESCRIPTION OF EMBODIMENTS

A hard coat layer-forming composition according to the embodiment is described below in detail.

As a hard coat layer-forming composition, there is a demand for a hard coat layer-forming composition capable of forming a hard coat layer having excellent adhesion to an adjacent layer (e.g., a primer layer or an antireflection film) and excellent hardness. These properties can be achieved with the hard coat layer-forming composition of the embodiment. The hard coat layer obtained from the composition and provided with an antireflection film thereon also demonstrates excellent abrasion resistance.

Note that, in the description, numerical values given before and after "to" are included in the range as the lower and upper limits thereof.

First, components contained in the hard coat layer-forming composition are described in detail.

<(Meth)Acrylate Having at Least One Group Selected from Group Consisting of Phosphate Group and Sulfonate Group>

The hard coat layer-forming composition contains (meth) acrylate (hereinafter also simply called "specific (meth) acrylate") having at least one group selected from the group consisting of a phosphate group and a sulfonate group (the at least one group being hereinafter also simply called "specific group").

The term "(meta)acrylate" refers to acrylate or methacrylate.

For the specific group, a phosphate group is preferred.

The number of the specific groups in the specific (meth) acrylate is at least one and may be two or more. The upper limit thereof may be not more than 5, for instance.

The specific (meth)acrylate may be monofunctional or polyfunctional. The "polyfunctional" means that the specific (meth)acrylate has two or more specific groups.

The phosphate group is represented by the formula below. * denotes a bonding position.

[Chemical Formula 1]

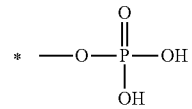

The sulfonate group is represented by the formula below.

[Chemical Formula 2]

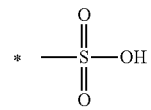

For the specific (meth)acrylate, a compound represented by Formula (A) is preferred.

$$CH_2=CR^a-COO-L^a-X \qquad \text{Formula (A)}$$

$R^a$ denotes a hydrogen atom or a methyl group.

$L^a$ denotes a divalent hydrocarbon group that may include a heteroatom (e.g., oxygen atom, nitrogen atom, sulfur atom). The number of carbon atoms in the divalent hydrocarbon group is not particularly limited and is preferably 1 to 10. Examples of the divalent hydrocarbon group include an alkylene group, an alkenylene group, an alkynylene group, an arylene group, and combinations thereof, with preferred being an alkylene group that may include a heteroatom (e.g., —O-alkylene group-).

X denotes a group selected from the group consisting of a phosphate group and a sulfonate group.

<Silsesquioxane Having Radical Polymerizable Group>

The hard coat layer-forming composition contains a silsesquioxane having a radical polymerizable group.

For the radical polymerizable group, a group having an ethylenically unsaturated bond is preferred. Examples of the group having an ethylenically unsaturated bond include a (meth)acryloyl group, a styryl group and a vinyl group.

The term "(meta)acryloyl group" refers to an acryloyl group or a methacryloyl group.

Typically, a silsesquioxane compound is a silane compound having the basic structure represented by Formula (B) as obtained through hydrolysis of a trifunctional silane compound such as alkoxysilane, chlorosilane or silanol. Known examples of the structure of the silsesquioxane compound include, in addition to an irregular form called a random structure, a ladder structure, a cage type (completely condensed cage type) structure, and an incomplete cage type structure (which is a partially cleaved structure of cage type structure; e.g., a structure lacking part of silicon atoms in a cage type structure, a structure in which a silicon-oxygen bond is cleaved in part of a cage type structure).

In Formula (B) below, $R^b$ denotes an organic group.

Formula (B)

The structure of the silsesquioxane compound having a radical polymerizable group is not particularly limited and may be any of the random structure, the ladder structure, the cage type structure, the incomplete cage type structure, and combinations of plural structures.

The equivalent of radical polymerizable group contained in the silsesquioxane compound is not particularly limited and is preferably 30 to 500 g/eq. and more preferably 30 to 150 g/eq. because the resulting hard coat layer can have more excellent hardness.

The silsesquioxane compound having a radical polymerizable group may be obtained through synthesis by a known method or may be a commercial product.

<Metal Oxide Particles>

The hard coat layer-forming composition contains metal oxide particles.

The type of the metal oxide particles is not particularly limited, and known metal oxide particles are usable. Exemplary metal oxide particles include particles of an oxide of at least one metal selected from Si, Al, Sn, Sb, Ta, Ce, La, Fe, Zn, W, Zr, In and Ti. In particular, the metal oxide particles are preferably particles of a Si-containing oxide (silicon oxide particles), particles of a Sn-containing oxide (tin oxide particles), particles of a Zr-containing oxide (zirconium oxide particles), or particles of a Ti-containing oxide (titanium oxide particles) for the sake of handleability.

The metal oxide particles may contain, among the metals listed above, one metal (one type of metallic atoms) alone or two or more metals (two or more types of metallic atoms).

Si (silicon) is sometimes classified as metalloid but is classified as metal in the present description.

The average particle size of the metal oxide particles is not particularly limited and is preferably 1 to 200 nm and more preferably 5 to 30 nm, for instance. When the average particle size is within the above range, the metal oxide particles exhibit more excellent dispersion stability in the hard coat layer-forming composition, while whitening of the resulting cured product can be further suppressed.

The average particle size above is determined by measuring the diameters of at least one hundred metal oxide particles with a transmitted light microscope and calculating the arithmetic mean of the measurements. When the metal oxide particles do not have a perfect circle shape, the major axis length is regarded as the diameter.

Various functional groups may optionally be introduced to surfaces of the metal oxide particles.

<Other Components>

The hard coat layer-forming composition may contain components other than the foregoing components (the specific (meth)acrylate, the silsesquioxane compound having a radical polymerizable group, and the metal oxide particles).

(Polyfunctional Acrylate)

The hard coat layer-forming composition may contain a polyfunctional (meth)acrylate that is different from both of the specific (meth)acrylate and the silsesquioxane having a radical polymerizable group because at least one of adhesion of the hard coat layer to an adjacent layer, hardness of the hard coat layer itself, and suppression of cracking of the hard coat layer can be more excellent (hereinafter also simply described as "because the predetermined effect becomes more excellent").

The term "polyfunctional (meth)acrylate" refers to a compound having a plurality of (meta)acryloyl groups. The number of (meta)acryloyl groups is not particularly limited and is preferably 2 to 6 and more preferably 2 to 3.

For the polyfunctional (meth)acrylate, a compound represented by Formula (C) is preferred.

$$CH_2=CR^{c1}-CO-L^{c1}-CO-CR^{c2}=CH_2 \quad \text{Formula (C)}$$

$R^{c1}$ and $R^{c2}$ each independently denote a hydrogen atom or a methyl group.

$L^{c1}$ denotes a divalent hydrocarbon group that may include a heteroatom (e.g., oxygen atom, nitrogen atom, sulfur atom). The number of carbon atoms in the divalent hydrocarbon group is not particularly limited and is preferably 1 to 10. Examples of the divalent hydrocarbon group include an alkylene group, an alkenylene group, an alkynylene group, an arylene group, and combinations thereof, with preferred being an alkylene group that may include a heteroatom.

In particular, an alkylene group including an oxygen atom is preferred, and a group represented by $-O-(L^{c2}-O)_m-$ is preferred. $L^{c2}$ denotes an alkylene group (having preferably 1 to 3 carbon atoms). m denotes an integer of at least 1, preferably an integer of 1 to 10, and more preferably an integer of 2 to 5.

(At Least One Selected from Group Consisting of Hydrolyzable Silicon Compound Represented by Formula (1), Hydrolysate Thereof and Hydrolyzed Condensate Thereof)

The hard coat layer-forming composition may contain at least one selected from the group consisting of a hydrolyzable silicon compound represented by Formula (1), a hydrolysate thereof and a hydrolyzed condensate thereof (hereinafter also simply called "hydrolyzable silicon compound(s)") because the predetermined effect becomes more excellent. The hydrolyzable silicon compound refers to a compound in which a hydrolyzable group is bonded to a silicon atom.

$$X-L-Si(R^1)_n(R^2)_{3-n} \quad \text{Formula (1)}$$

X denotes an epoxy group.

The epoxy group is a group represented by the formula below. $R^3$ denotes a hydrogen atom or an alkyl group (e.g., methyl group, ethyl group, propyl group). * denotes a bonding position.

[Chemical Formula 3]

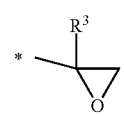

L denotes a divalent hydrocarbon group that may include a heteroatom. The number of carbon atoms in the hydrocarbon group is not particularly limited and is preferably 1 to 10. Examples of the divalent hydrocarbon group include an alkylene group, an alkenylene group, an alkynylene group, an arylene group, and combinations thereof, with preferred being an alkylene group that may include a heteroatom.

$R^1$ denotes a hydrolyzable group. The hydrolyzable group is directly bonded to Si (silicon atom) and may promote a hydrolysis reaction and/or a condensation reaction. Examples of the hydrolyzable group include an alkoxy group, a hydroxyl group, a halogen atom, an acyloxy group, an alkenyloxy group and an isocyanate group.

$R^2$ denotes an alkyl group. The number of carbon atoms in the alkyl group is preferably 1 to 10.

n denotes an integer of 1 to 3. n is preferably 3.

A hydrolysate of the hydrolyzable silicon compound refers to a compound obtained through hydrolysis of one or more hydrolyzable groups in the hydrolyzable silicon compound. The hydrolysate may be a product obtained through hydrolysis of all the hydrolyzable groups (complete hydrolysate) or a product obtained through hydrolysis of some of the hydrolyzable groups (partial hydrolysate). That is, the hydrolysate may be a complete hydrolysate, a partial hydrolysate or a mixture thereof.

A hydrolyzed condensate of the hydrolyzable silicon compound refers to a compound obtained through hydrolysis of one or more hydrolyzable groups in the hydrolyzable silicon compound and subsequent condensation of the resulting hydrolysate. The hydrolyzed condensate may be a product obtained through hydrolysis of all the hydrolyzable groups and subsequent condensation of the whole of the resulting hydrolysate (completely hydrolyzed condensate) or a product obtained through hydrolysis of some of the hydrolyzable groups and subsequent condensation of part of the resulting hydrolysate (partially hydrolyzed condensate). That is, the hydrolyzed condensate may be a completely hydrolyzed condensate, a partially hydrolyzed condensate or a mixture thereof.

(Radical Polymerization Initiator)

The hard coat layer-forming composition may contain a radical polymerization initiator. Examples of the radical polymerization initiator include a photo-radical polymerization initiator and a thermal-radical polymerization initiator.

Examples of the radical polymerization initiator include IRGACURE 127, 184, 07, 651, 1700, 1800, 819, 369, 261, TPO, and DAROCUR 1173 manufactured by BASF Corporation, Esacure KIP150 and TZT manufactured by Nihon SiberHegner K.K., and CAYACURE BMS and CAYACURE DMBI manufactured by Nihon Kayaku Co., Ltd.

(Solvent)

The hard coat layer-forming composition may contain a solvent.

The solvent may be water or an organic solvent.

The organic solvent is not particularly limited in type, and examples thereof include an alcoholic solvent, a ketone solvent, an ether solvent, an ester solvent, a hydrocarbon solvent, a halogenated hydrocarbon solvent, an amide solvent, a sulfone solvent and a sulfoxide solvent.

The hard coat layer-forming composition may optionally contain various additives such as a UV absorber, an antiaging agent, a coating adjusting agent, a light stabilizer, an antioxidant, a discoloration preventing agent, a dye, a filler and an internal mold release agent.

<Hard Coat Layer-Forming Composition>

The hard coat layer-forming composition contains various components as described above.

The producing method of the hard coat layer-forming composition is not particularly limited; for example, the foregoing components may be mixed at one time or in separate steps.

When the hydrolyzable silicon compound as above is used, a method in which a hydrolysis reaction and a condensation reaction of the hydrolyzable silicon compound are allowed to proceed to thereby produce a hydrolysate and/or a hydrolyzed condensate and subsequently the hydrolysate and/or the hydrolyzed condensate is mixed with other components may be employed, for example.

The specific (meth)acrylate content of the hard coat layer-forming composition is not particularly limited and is preferably 5 to 30 mass % and more preferably 5 to 20 mass % based on the total solids (hard coat layer constituents) of the hard coat layer-forming composition because the predetermined effect becomes more excellent.

The total solids (hard coat layer constituents) refer to components that constitute a hard coat layer formed through curing treatment and correspond to, inter alia, the specific (meth)acrylate, the silsesquioxane compound having a radical polymerizable group, the metal oxide particles, the polyfunctional (meth)acrylate, the hydrolyzable silicon compound(s) and the radical polymerization initiator as described above, while the solvent is not included in the total solids. Even if a component is a liquid, this component is counted as a solid as long as this is a constituent of the hard coat layer.

The content of the silsesquioxane compound having a radical polymerizable group in the hard coat layer-forming composition is not particularly limited and is preferably 10 to 60 mass % and more preferably 20 to 55 mass % based on the total solids of the hard coat layer-forming composition because the predetermined effect becomes more excellent.

The metal oxide particle content of the hard coat layer-forming composition is not particularly limited and is preferably 10 to 70 mass % and more preferably 25 to 55 mass % based on the total solids of the hard coat layer-forming composition because the predetermined effect becomes more excellent.

When the polyfunctional (meth)acrylate is contained in the hard coat layer-forming composition, the polyfunctional (meth)acrylate content is not particularly limited and is preferably 1 to 30 mass % and more preferably 3 to 16 mass % based on the total solids of the hard coat layer-forming composition because the predetermined effect becomes more excellent.

When the hydrolyzable silicon compound(s) is contained in the hard coat layer-forming composition, the content of the hydrolyzable silicon compound(s) is not particularly limited and is preferably 0.5 to 30 mass % and more preferably 1 to 10 mass % based on the total solids of the hard coat layer-forming composition because the predetermined effect becomes more excellent.

In the present description, in calculation of the content of the hydrolyzable silicon compound(s), the content is calculated based on the mass of the compound before being hydrolyzed for convenience.

When the radical polymerization initiator is contained in the hard coat layer-forming composition, the radical polymerization initiator content of the hard coat layer-forming composition is not particularly limited and is preferably 0.05 to 5 mass % and more preferably 0.1 to 3 mass % based on the total solids of the hard coat layer-forming composition because the predetermined effect becomes more excellent.

The mass ratio of the specific (meth)acrylate content to the metal oxide particle content (specific (meth)acrylate content/metal oxide particle content) is not particularly limited and is preferably 0.15 to 0.80 and more preferably 0.20 to 0.80 because the predetermined effect becomes more excellent.

The mass ratio of the content of the silsesquioxane having a radical polymerizable group to the metal oxide particle content (content of the silsesquioxane having a radical polymerizable group/metal oxide particle content) is not particularly limited and is preferably 0.60 to 5.0 and more preferably 0.60 to 1.00 because the predetermined effect becomes more excellent.

The mass ratio of the specific (meth)acrylate content to the content of the silsesquioxane having a radical polymerizable group (specific (meth)acrylate content/content of the silsesquioxane having a radical polymerizable group) is not particularly limited and is preferably 0.10 to 0.70 because the predetermined effect becomes more excellent.

The hard coat layer-forming composition is favorably employed as a composition for forming a hard coat layer on or above a base. As the base, a spectacle lens base is preferred. In addition, as the base, a plastic base is preferred.

Examples of the plastic base include a plastic spectacle lens base and a plastic film.

In the latter part, an embodiment in which the hard coat layer-forming composition is applied onto the plastic spectacle lens base is described in detail as an example. In the latter part, described is the case where a plastic spectacle lens base is used, but the present invention is not limited thereto as long as a base (in particular, a spectacle lens base) is used.

<Spectacle Lens>

FIG. 1 is a cross-sectional view of a spectacle lens of one embodiment.

A spectacle lens 10 shown in FIG. 1 includes a plastic spectacle lens base 12 and hard coat layers 14 separately disposed on the opposite sides of the plastic spectacle lens base 12. The hard coat layers 14 are layers formed from the hard coat layer-forming composition described above.

While each hard coat layer 14 is disposed in direct contact with the plastic spectacle lens base 12 in FIG. 1, the invention is not limited thereto, and another layer (e.g., a primer layer) may be disposed between the plastic spectacle lens base 12 and the hard coat layer 14. That is, the hard coat layer 14 may be disposed directly on or indirectly, via another layer, above the plastic spectacle lens base 12.

In addition, while the hard coat layers 14 are separately disposed on the opposite sides of the plastic spectacle lens base 12 in FIG. 1, the hard coat layer 14 may be disposed only on one side of the plastic spectacle lens base 12.

Members included in the spectacle lens 10 are described below in detail.

(Plastic Spectacle Lens Base)

The plastic spectacle lens base is not particularly limited in type, and one example thereof is a finished lens that is obtained through optical finishing of both the convex and concave surfaces and shaping according to a desired power.

Plastic (so-called resin) constituting the plastic spectacle lens base is not particularly limited in type, and examples thereof include (meth)acrylic resin, thiourethane resin, allyl resin, episulfide resin, polycarbonate resin, polyurethane resin, polyester resin, polystyrene resin, polyethersulfone resin, poly-4-methylpentene-1 resin, diethylene glycol bis (allyl carbonate) resin (CR-39), and polyvinyl chloride resin.

The thickness of the plastic spectacle lens base is not particularly limited and, in most cases, is about 1 to about 30 mm for the sake of handleability.

The refractive index of the plastic spectacle lens base is not particularly limited.

The plastic spectacle lens base need not be transparent as long as it is translucent, and may be colored.

(Hard Coat Layer)

The hard coat layer is a layer disposed on or above the plastic spectacle lens base and imparting abrasion resistance to the plastic spectacle lens base.

The hard coat layer is a layer formed from the hard coat layer-forming composition described above.

One exemplary formation method of the hard coat layer is a method involving applying the hard coat layer-forming composition described above onto the plastic spectacle lens base to form a coating and subjecting the coating to curing treatment such as light irradiation treatment.

The formation of the coating may optionally be followed by drying treatment such as heating treatment in order to remove the solvent from the coating.

The method of applying the hard coat layer-forming composition onto the plastic spectacle lens base is not particularly limited, and known methods (e.g., dip coating, spin coating, spray coating, ink jet coating and flow coating) are usable. When dip coating is employed for instance, the plastic spectacle lens base is immersed in the hard coat layer-forming composition and then pulled out and dried, whereby a coating with a predetermined coating thickness can be formed on the plastic spectacle lens base.

The coating thickness of the coating formed on or above the plastic spectacle lens base is not particularly limited and suitably selected to allow the resulting hard coat layer to have a predetermined coating thickness.

The conditions for light irradiation treatment are not particularly limited, and suitable conditions are selected according to the type of the radical polymerization initiator to be used.

The light for light irradiation is not particularly limited in type, and examples thereof include a UV ray and a visible ray. The light source may be, for example, a high-pressure mercury vapor lamp.

The cumulative light quantity during light irradiation is not particularly limited and is preferably 100 to 3,000 $mJ/cm^2$ and more preferably 100 to 1,500 $mJ/cm^2$ for the sake of productivity and curing properties of the coating.

The coating thickness of the hard coat layer is not particularly limited and is preferably not less than 1 μm, more preferably not less than 5 μm and even more preferably not less than 10 μm. The upper limit of the coating thickness may be not more than 30 μm, for instance.

The above coating thickness is the average coating thickness, which is determined by measuring the coating thickness of the hard coat layer at given five points and calculating the arithmetic mean of the measurements.

The primer layer is a layer disposed between the base and the hard coat layer and serves to improve adhesion of the hard coat layer to the base.

A material constituting the primer layer is not particularly limited, and any known materials are usable. For instance, resin is mainly used. The resin for use is not particularly limited in type, and examples thereof include urethane resin, epoxy resin, phenol resin, polyimide resin, polyester resin, bismaleimide resin and polyolefin resin.

The method of forming the primer layer is not particularly limited, and any known method may be employed. One exemplary method involves applying a primer layer-forming composition containing a predetermined resin onto the base, optionally followed by curing treatment, thereby forming the primer layer.

The thickness of the primer layer is not particularly limited and is preferably selected within the range from 0.3 to 2 μm.

The plastic spectacle lens is not limited to the embodiment shown in FIG. 1 and may further include an antireflection film disposed on the hard coat layer.

The antireflection film constitutes a layer having a function of preventing the reflection of incident light. Specifically, the antireflection film may have low reflection characteristics over the entire visible range from 400 to 700 nm (wide-band low reflection characteristics).

The antireflection film is not particularly limited in structure and may be of a single layer structure or a multilayer structure.

For the antireflection film, an inorganic antireflection film is preferred. The inorganic antireflection film is an antireflection film constituted of an inorganic compound.

In the case of multilayer structure, it is preferable to have the structure in which a low refractive index layer(s) and a high refractive index layer(s) are alternately stacked. Exemplary materials that may be used to form the high refractive index layer include oxides of titanium, zircon, aluminum, niobium, tantalum and lanthanum. Exemplary materials that may be used to form the low refractive index layer include oxides such as silica.

The producing method of the antireflection film is not particularly limited, and examples thereof include dry methods such as vacuum evaporation, sputtering, ion plating, ion-beam assisted deposition and CVD.

EXAMPLES

The hard coat layer-forming composition is described below in further detail by way of examples and comparative examples; however, the invention should not be construed as being limited to the following examples.

Example 1

Acid phosphoxy ethyl methacrylate (Phosmer M, manufactured by Unichemical Co., Ltd.) (10 parts by mass) as a specific (meth)acrylate, methacrylic silsesquioxane (AC-SQ TA-100 manufactured by Toagosei Co., Ltd.) (40 parts by mass) as a silsesquioxane having a radical polymerizable group, silicon dioxide nanoparticle containing NanoTek slurry (manufactured by CIK NanoTek Corporation: 40 mass % of silicon dioxide, 60 mass % of propylene glycol monomethyl ether) (125 parts by mass) as metal oxide particles, and a radical polymerization initiator IRGACURE 127 (3 parts by weight) were mixed to thereby obtain a hard coat layer-forming composition 1.

To an aqueous urethane dispersion (EVAFAL HA-170 manufactured by Nicca Chemical Co., Ltd.; solid concentration of 37 mass %) (200 parts by mass), pure water (289 parts by mass), propylene glycol monomethyl ether (10.6 parts by mass), and L77 (manufactured by Momentive Performance Materials) (0.2 parts by mass) and L-7604 (manufactured by The Dow Chemical Company) (0.2 parts by mass) as surfactants were added and stirred to thereby produce a primer solution with a solid concentration of 14.8 mass %.

A lens (Nikon Lite 3AS material S-3.00D, manufactured by Nikon-Essilor Co., Ltd.) with a refractive index of 1.60 was used as a plastic spectacle lens base.

The plastic spectacle lens base was immersed in the primer solution, and then pulled out and baked for 20 minutes at 90° C. to thereby form a primer layer.

Next, the hard coat layer-forming composition 1 (1.5 ml) was dropped on the primer layer, whereafter the plastic spectacle lens base applied with the hard coat layer-forming composition 1 was rotated at 1,000 rpm for 10 seconds for spin coating. Next, the obtained plastic spectacle lens base was heated at 90° C. for 10 minutes, and then the coating was irradiated with UV light (cumulative light quantity: 1.6 J/cm$^2$) using a high-pressure mercury vapor lamp (100 W/cm$^2$) as a light source, thereby forming a hard coat layer.

The same treatment as above was performed also on the other surface of the plastic spectacle lens base, whereby a hard coat layer-bearing plastic spectacle lens base was obtained in which the hard coat layers were separately disposed on the opposite sides of the plastic spectacle lens base.

The obtained hard coat layer-bearing plastic spectacle lens base was set on a rotatable dome installed in a vacuum tank, the temperature inside the vacuum tank was increased to 70° C., and air was discharged to a pressure of $1.0 \times 10^{-3}$ Pa. Subsequently, one of the hard coat layers was subjected to Ar ion beam cleaning for 60 seconds under conditions of an accelerating voltage of 500 V and an accelerating current of 100 mA. Thereafter, a first layer SiO$_2$ (refractive index: 1.47) with an optical thickness of 0.090λ, a second layer ZrO$_2$ (refractive index: 2.00) with an optical thickness of 0.038λ, a third layer SiO$_2$ (refractive index: 1.47) with an optical thickness of 0.393λ, a fourth layer ZrO$_2$ (refractive index: 2.00) with an optical thickness of 0.104λ, a fifth layer SiO$_2$ (refractive index: 1.47) with an optical thickness of 0.069λ, a sixth layer ZrO$_2$ (refractive index: 2.00) with an optical thickness of 0.289λ, and a seventh layer SiO$_2$ (refractive index: 1.47) with an optical thickness of 0.263λ were sequentially stacked on the cleaned hard coat layer, thereby forming an antireflection film. λ denoting the central wavelength in the design was set to 500 nm.

The same treatment as above was performed also on the other hard coat layer, whereby the antireflection films were separately formed on the opposite sides of the hard coat layer-bearing plastic spectacle lens base. Thus, an antireflection film-bearing plastic spectacle lens base (corresponding to a spectacle lens) was obtained.

Examples 2 to 8 and Comparative Example 1

A hard coat layer-bearing plastic spectacle lens base and an antireflection film-bearing plastic spectacle lens base (corresponding to a spectacle lens) were obtained according to the same procedure as Example 1 except that the contents (parts by mass) of the components used were changed as shown in Table 1 described below.

A zirconium oxide nanoparticle sol (manufactured by KANTO DENKA KOGYO CO., LTD., 40 mass % of zirconium oxide, 60 mass % of propylene glycol monomethyl ether) was used as the "ZrO$_2$ particle" in Table 1.

3-glycydoxypropyl trimethoxysilane (KBM403, manufactured by Shin-Etsu Silicone) was used as the "Hydrolyzable silicon compound(s)" in Table 1.

Tetra ethylene glylcol diacrylate was used as the "Polyfunctional (meth)acrylate" in Table 1.

IRGACURE 127 (manufactured by BASF Corporation) was used as the "radical polymerization initiator" in Table 1.

<Evaluation>

With the hard coat layer-bearing plastic spectacle lens bases and the antireflection film-bearing plastic spectacle lens bases obtained in Examples and Comparative Example above, the evaluations below were conducted. The results are all shown in Table 1 below.

(Adhesion (1))

The adhesion of the hard coat layer was examined by the cross cut tape test according to JIS K 5600.

To be more specific, with a knife, the surface of the hard coat layer of the hard coat layer-bearing plastic spectacle lens base was cut at 1-mm intervals to reach the plastic spectacle lens base; thus, 25 squares were formed. Next, a scotch tape (manufactured by 3M Corporation) was firmly pressed against the thus cut hard coat layer. Subsequently, the scotch tape was quickly pulled under 4 kg load toward the 60° direction relative to the surface of the hard coat layer and thereby peeled off, whereafter the number of squares remaining on the plastic spectacle lens base was counted.

(Adhesion (2))

The adhesion of the hard coat layer was examined by the cross cut tape test according to JIS K 5600.

To be more specific, with a knife, the surface of the antireflection film of the antireflection film-bearing plastic spectacle lens base was cut at 1-mm intervals to reach the plastic spectacle lens base; thus, 100 squares were formed. Next, a scotch tape (manufactured by 3M Corporation) was firmly pressed against the thus cut antireflection film. Subsequently, the scotch tape was quickly pulled under 4 kg load toward the 60° direction relative to the surface of the antireflection film and thereby peeled off, whereafter the number of squares remaining on the plastic spectacle lens base was counted.

(Abrasion Resistance)

The surface of the hard coat layer in the antireflection film-bearing plastic spectacle lens base was rubbed back and forth 50 times with BONSTER #0000 steel wool (manufactured by Nippon Steel Wool Co., Ltd.) under 2 kg load, and the amount of scratches given at the surface (1 cm×3 cm) of the hard coat layer was visually evaluated and rated as follows.

∘: Excellent (no scratch was found)

Table 1 shows the amounts (parts by mass) of the respective components contained in each hard coat layer-forming composition.

The "Coating thickness (μm)" in Table 1 represents the coating thickness of each hard coat layer.

In Table 1, the "A/B" represents the mass ratio of (A) specific (meth)acrylate content to (B) content of the silsesquioxane having a radical polymerizable group.

In Table 1, the "A/C" represents the mass ratio of (A) specific (meth)acrylate content to (C) metal oxide particle content.

In Table 1, the "B/C" represents the mass ratio of (B) content of the silsesquioxane having a radical polymerizable group to (C) metal oxide particle content.

TABLE 1

| Table 1 | (A) Specific (meth)acrylate | | (B) Silsesquioxane having radical polymerizable group | (C) Metal oxide microparticles | | Hydrolyzable silicon compound(s) | Poly-functional (meth)acrylate | Radical polymerization initiator | A/B |
|---|---|---|---|---|---|---|---|---|---|
| | Phosmer M | Sulfonate methacrylate | | $SiO_2$ particles | $ZrO_2$ particles | | | | |
| Comparative Example 1 | — | — | 100 | — | — | — | — | 3 | — |
| Example 1 | 10 | — | 40 | 50 | — | — | — | 3 | 0.25 |
| Example 2 | 20 | — | 30 | 50 | — | — | — | 3 | 0.67 |
| Example 3 | 10 | — | 50 | 40 | — | — | — | 3 | 0.20 |
| Example 4 | 20 | — | 50 | 30 | — | — | — | 3 | 0.40 |
| Example 5 | 10 | — | 39 | 44 | — | 2 | 5 | 3 | 0.26 |
| Exemple 6 | 8 | — | 31 | 43 | — | 2 | 16 | 3 | 0.26 |
| Example 7 | 10 | — | 52 | — | 38 | — | — | 3 | 0.19 |
| Example 8 | — | 10 | 40 | 50 | — | — | — | 3 | 0.25 |

| | A/C | B/C | thickness (μm) | Adhesion (1) | Adhesion (2) | Abrasion resistance | Hardness | Cracking |
|---|---|---|---|---|---|---|---|---|
| Comparative Example 1 | — | — | 32.2 | 0/100 | 0/100 | — | 6H | 0/3 |
| Example 1 | 0.20 | 0.80 | 17.9 | 100/100 | 100/100 | ∘ | 9H | 2/3 |
| Example 2 | 0.40 | 0.60 | 22.8 | 100/100 | 100/100 | ∘ | 9H | 2/3 |
| Example 3 | 0.25 | 1.25 | 24.2 | 100/100 | 100/100 | ∘ | 9H | 0/3 |
| Example 4 | 0.67 | 1.67 | 19.3 | 100/100 | 100/100 | ∘ | 9H | 0/3 |
| Example 5 | 0.23 | 0.89 | 18.2 | 1.00/100 | 100/100 | ∘ | 9H | 3/3 |
| Exemple 6 | 0.19 | 0.72 | 20.1 | 100/100 | 100/100 | ∘ | 9H | 3/3 |
| Example 7 | 0.26 | 1.37 | 19.3 | 100/100 | 100/100 | ∘ | 8H | 3/3 |
| Example 8 | 0.20 | 0.80 | 24.3 | 100/100 | 100/100 | ∘ | 8H | 1/3 |

Δ: Good (less than 30 shallow scratches were found, but there was no problem in practical use)

x: Poor (over 30 scratches were found, and there was a problem in practical use)

(Hardness)

The hard coat layer-bearing plastic spectacle lens base was used to measure the hardness of the hard coat layer with a pencil. The pencil was obliquely pushed against the hard coat layer, and hardness immediately before the hardness with which scratches were made was defined as the hardness of that film. For example, in the case where scratches were not made at 8H but made at 9H, the hardness of that hard coat layer was determined to be 8H.

(Cracking)

In each of Examples and Comparative Example, three hard coat layer-bearing plastic spectacle lens bases were prepared and visually examined whether cracking occurred in the hard coat layers, and of the three bases, the number of hard coat layer-bearing plastic spectacle lens bases having no cracking was evaluated (in Table 1, X in "X/3" denotes the number of hard coat layer-bearing plastic spectacle lens bases having no cracking).

As shown in Table 1, the results confirmed that the use of the hard coat layer-forming composition containing the predetermined components brought about desired effects of excellent adhesion between the primer layer and the antireflection film and high hardness.

In particular, it was confirmed from the comparison between Examples 1 and 2 and Examples 3 and 4 that when the mass ratio of the content of the silsesquioxane having a radical polymerizable group to the metal oxide particle content was 0.60 to 1.00, cracking less likely occurred.

It was also confirmed from the comparison between Examples 1, 5 and 6 that when the hard coat layer-forming composition contained a polyfunctional (meth)acrylate and/or a hydrolyzable silicon compound(s), cracking less likely occurred.

It was also confirmed from the comparison between Examples 3 and 7 that when $SiO_2$ particles were used as the metal oxide particles, the hardness was more excellent.

It was also confirmed from Examples 1 and 8, when the specific (meth)acrylate had a phosphate group, the hardness was more excellent.

REFERENCE SIGNS LIST 10 spectacle lens
12 plastic spectacle lens base
14 hard coat layer

What is claimed is:

1. A hard coat layer-forming composition comprising:
a (meth) acrylate having at least one group, and not more than five groups, selected from the group consisting of a phosphate group and a sulfonate group;
a silsesquioxane having a radical polymerizable group; and
metal oxide particles.

2. The hard coat layer-forming composition according to claim 1, further including a polyfunctional (meth)acrylate which is different from both of the (meth)acrylate and the silsesquioxane.

3. The hard coat layer-forming composition according to claim 1, further including at least one selected from the group consisting of a hydrolyzable silicon compound represented by Formula (1):

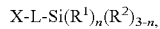 Formula (1)

a hydrolysate thereof, and a hydrolyzed condensate thereof,
where X denotes an epoxy group, L denotes a divalent hydrocarbon group that may include a heteroatom, $R^1$ denotes a hydrolyzable group, $R^2$ denotes an alkyl group, and n denotes an integer from 1 to 3.

4. The hard coat layer-forming composition according to claim 1, wherein a mass ratio of a content of the (meth) acrylate to a content of the metal oxide particles is 0.20 to 0.80.

5. The hard coat layer-forming composition according to claim 1, wherein a mass ratio of a content of the silsesquioxane to a content of the metal oxide particles is 0.60 to 5.0.

6. The hard coat layer-forming composition according to claim 1,
wherein the hard coat layer-forming composition is used to form a hard coat layer on or above a base, and
wherein the base is a spectacle lens base.

7. A spectacle lens comprising:
a spectacle lens base; and
a hard coat layer formed using the hard coat layer-forming composition according to claim 1 and disposed on or above the spectacle lens base.

8. The spectacle lens according to claim 7, wherein the hard coat layer has a coating thickness of not less than 10 μm.

9. The spectacle lens according to claim 7, including a primer layer disposed between the base and the hard coat layer.

10. The spectacle lens according to claim 7, including an antireflection film disposed on the hard coat layer.

* * * * *

UNITED STATES PATENT AND TRADEMARK OFFICE
CERTIFICATE OF CORRECTION

| | | |
|---|---|---|
| PATENT NO. | : 12,129,395 B2 | Page 1 of 1 |
| APPLICATION NO. | : 17/358338 | |
| DATED | : October 29, 2024 | |
| INVENTOR(S) | : Yuka Igami | |

It is certified that error appears in the above-identified patent and that said Letters Patent is hereby corrected as shown below:

On the Title Page

Item (57), Column 2, Line 8, Delete "silsequioxane" and insert -- silsesquioxane --.

Signed and Sealed this
Thirty-first Day of December, 2024

Derrick Brent
*Acting Director of the United States Patent and Trademark Office*